United States Patent

[11] 3,617,338

[72] Inventors Robert J. Caiola
 Fort Wayne, Ind.;
 Carl E. Dewald, Findlay, Ohio
[21] Appl. No. 867,809
[22] Filed Oct. 20, 1969
[45] Patented Nov. 2, 1971
[73] Assignee The Dow Chemical Company
 Midland, Mich.

[54] METHOD FOR PRODUCING A LATENT STRIATED EFFECT ON PLASTIC FILMS
 9 Claims, 5 Drawing Figs.
[52] U.S. Cl. ................................................. 117/37 R,
 8/4, 117/106 R, 117/118, 264/83
[51] Int. Cl. ........................................................ B05c 1/16,
 B29c 25/00
[50] Field of Search ........................................... 117/37 R,
 106 R; 8/4; 264/83

[56] References Cited
UNITED STATES PATENTS
2,400,720  5/1946  Staudinger et al. ............ 117/118
2,989,363  6/1961  Hartmann et al. ............. 8/4

Primary Examiner—Robert F. Burnett
Assistant Examiner—Linda M. Carlin
Attorneys—Griswold and Burdick, Lester J. Dankert and Richard G. Waterman ABSTRACT: A process and apparatus for the rapid vapor phase sulfonation of plastic films wherein the film is treated with a jet of a gas containing sulfur trioxide to achieve a latent striated effect. Subsequent dyeing of the treated film with water soluble dyes produces an attractively decorated, distinctive film useful as a wrapping material for edible and nonedible consumer goods.

INVENTORS.
Robert J. Caiola
Carl E. Dewald

BY B. B. Colley
AGENT

METHOD FOR PRODUCING A LATENT STRIATED EFFECT ON PLASTIC FILMS

BACKGROUND OF THE INVENTION

This invention relates to apparatus and method for the selective vapor phase sulfonation of plastic films.

It is known from U.S. Pat. 2,400,720 that aromatic plastic films can be sulfonated in an atmosphere or sulfur trioxide ($SO_3$) and dyed. However, in the manufacture of large quantities of sulfonated film by this process, it was found that an intolerable amount of $SO_3$ escaped from the apparatus, that moisture in the ambient air or on the plastic film inhibited the sulfonation reaction, and that the reaction required a relatively long residence time in the $SO_3$ atmosphere and was too slow for rapid production.

SUMMARY OF THE INVENTION

It now has been discovered that plastic or polymer webs can be rapidly given a latent striated effect by a process and apparatus in which the polymer film is contacted with a jet of a dry gas containing $SO_3$ in a substantially dry atmosphere and subsequently dyed.

This invention is useful in the large volume production of decorated plastic films where high speeds, e.g. up to 1000 feet per minute, are desired with uniform sulfonation and dyeing. The decorated plastic film so produced can be used for Christmas wrapping, lettuce wrap, and wrapping or sacks for citrus fruits, apples, etc.

In accordance with this invention a method and apparatus is disclosed in which plastic films are treated to achieve a latent striated effect by moving the plastic film through a substantially dry gaseous sulfonation zone containing a jet generating zone at a predetermined rate of speed and simultaneously contacting at least one side of said film in said sulfonation zone with at least one jet of a dry gas containing gaseous sulfur trioxide and having a predetermined size from said jet generating zone at a predetermined distance from said zone. If desired, the film can be given more than one striation by contacting it with a plurality of laterally spaced jets. It is also sometimes desirable to contact both sides of the film with either a single jet, a plurality of jets or a combination of both.

Still further decorative effects are obtained if the plastic film to be striated has on side previously surface sulfonated and the opposite side is striated by a single or a plurality of striations. This latent striated film then can be dyed different colors on one side and contrasting colors on the other to produce interesting effects. For example, by the proper choice of dyes it is possible to have two different colors (blue and yellow) by reflected light and a third color (green) by transmitted light through the overlapping dyed surfaces.

DETAILED DESCRIPTION OF THE INVENTION

According to the process of the present invention, polymer films made from plastics such as polyolefins, vinyl aromatic polymers, polyesters, etc. as well as blends thereof, and laminates thereof, are given a latent striated effect by contacting the film with a jet of a dry gas containing $SO_3$ in a substantially dry atmosphere. It is essential to this invention that the gaseous atmosphere contained in, associated with, or in contact with the sulfonation treatment zone of this invention be substantially dry. Likewise, it is essential that the polymer film to be treated is either substantially dry or rendered by a drying step prior to the sulfonation step.

The drying step is to remove surface moisture from the polymer web since the presence of moisture causes the formation of sulfuric acid when $SO_3$ contacts the moisture. The presence of sulfuric acid droplets on the polymer web interferes with the uniform sulfonating of the polymeric surface or surface layers. This drying step, when used, can be accomplished by a drying oven, a blast of dry inert gas, or by moving the polymer web through a chamber of dry inert gas which is maintained in a dry condition by suitable recirculating and drying means.

For the purpose of this invention, the term dry gas means one having a dew point below 10° C. It is preferred to use a gas having a dew point below −40° C. The use of a blast of a dry inert gas in preferred since this positive force of gas molecules has a scrubbing or scouring action on the film surface which substantially removes all the water molecules. For the purposes of this invention a blast or jet of gas is intended to mean a sheet, or jet of gas molecules having a narrow width relative to the width of the film, flowing at a rate greater than about 10 feet per second and preferably in the range from about 100 to about 200 feet per second.

It is to be understood that the drying step can be dispensed with when the ambient air of the laboratory or plant is already sufficiently dry as in periods of low humidity during wintertime or in naturally dry, desert like atmospheres.

The essential step in this process involves contracting the dry polymer web with a jet of an inert gas containing gaseous $SO_3$. This step involves movement of the polymer film through a jet of gaseous $SO_3$. The advantage of this technique is that it can run continuously and at high speeds.

It is desirable in the process of the present invention that after the sulfonation step, the treated polymer films are contacted with a continuous blast or sheet of dry inert gas to remove excess $SO_3$. This removed $SO_3$ is then exhausted out of the surrounding area and can be disposed of by suitable means, e.g., neutralization with aqueous solutions of bases. Thus, contamination of the surrounding atmosphere does not take place.

The sulfonated and striated polymer film can then be dyed with an aqueous solution of a dye. Thus, the web can be dipped into or sprayed with an aqueous solution of a commercial dye to being out the latent striated effect. Examples of commercially available water soluble dyes are Malachite Green, Methylene Blue, Bismark Brown, Methyl Violet, and Astrazon Blue.

DESCRIPTION OF DRAWINGS

The present invention is further illustrated by the drawings wherein.

DETAILED DESCRIPTION OF DRAWINGS

Figure 1:
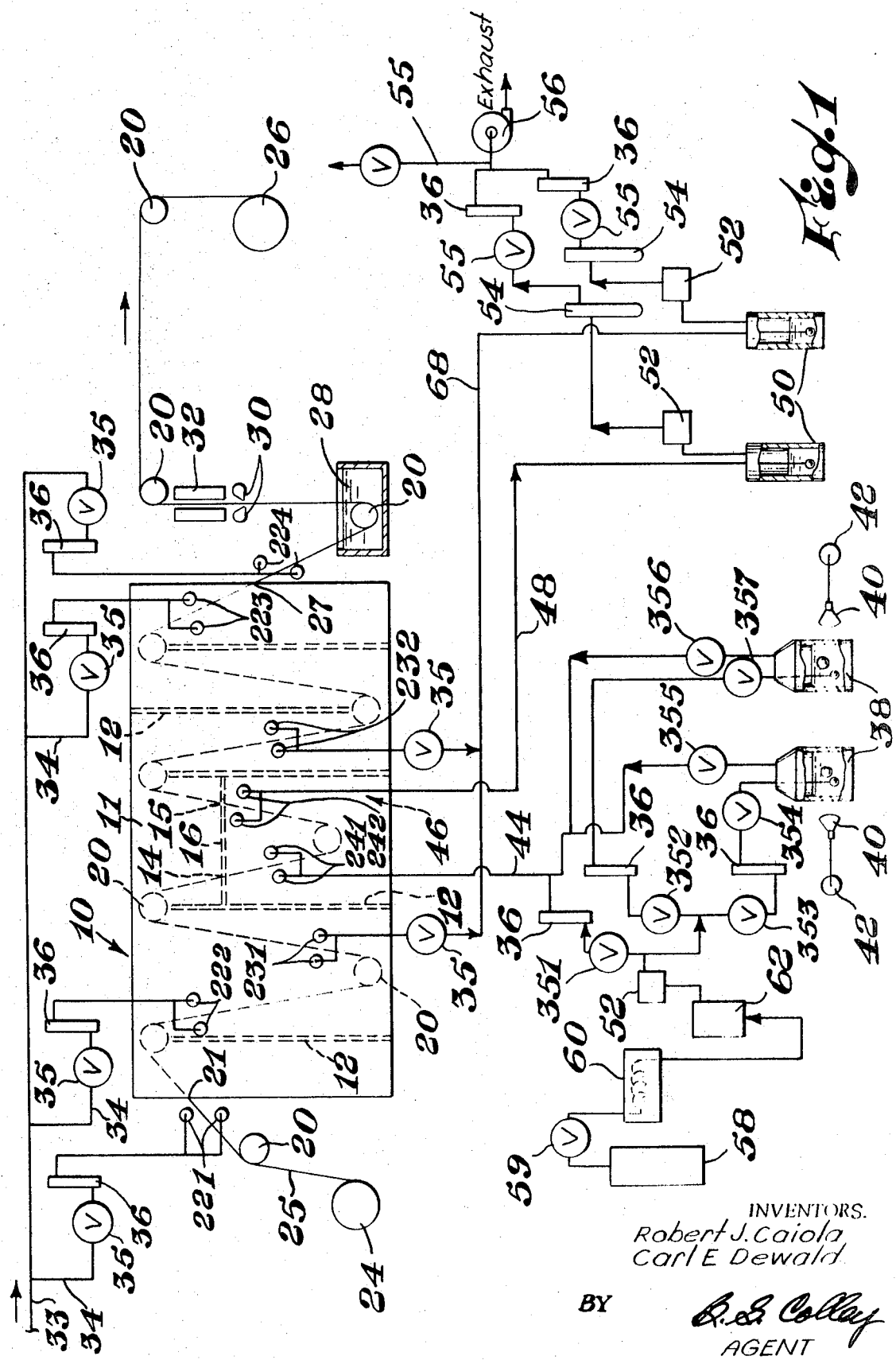
FIG. 1 is a schematic view showing one embodiment of the apparatus in which the polymer web 25 going through the sulfonation chamber 10 is treated with a sequence of dry gases provided by the associated equipment, given a dye bath and dried before rewinding.

FIG. 1 shows the apparatus useful in this invention in which an enclosed sulfonation chamber 10 having a front side wall 11, rear side wall 13 (shown in FIG. 3) is associated with a dye bath 28 together with various associated apparatus to supply gaseous $SO_3$ which will be described later.

In chamber 10 there are a series of vertical baffles 12 which substantially divide the chamber 10 into a series of compartments. The horizontal baffle 16 in chamber 10 together with vertical baffles 12 define the sulfonation zone 46. This baffle 16 has inlet and outlet slots 14 and 15 respectively for the passage of the polymer film.

The plastic film 25 is unwound from the feed roller 24 and fed into the inlet slot 21 of the sulfonation chamber 10 over an idler roller 20. Throughout the sulfonation chamber there are suitably mounted a series of other idler rollers 20 at the upper or lower ends of the vertical baffles 12 to effectively divide chamber 10 into various zones.

The incoming polymer web 25 is scrubbed dry by the first inert gas tubular scrubbers 221 located adjacent to and outside the chamber 10 and further dried by a second set of inert gas tubular scrubbers 222 located inside the chamber 10. Tubular scrubbers 221 also insure that no moist air enters the sulfonation chamber 10. These scrubbers are located as indicated in FIG. 1 and extend across the width of the sulfonation chamber with an axial slot (not shown) in them extending substantially the width of the chamber adjacent to and somewhat less than the width of the polymer film.

The excess inert gas introduced into chamber 10 and any $SO_3$ that inadvertently leaks out of the sulfonation zone 46 through slots 14 and 15 is exhausted by means of the first inert gas tubular exhaust 231. The second inert gas tubular exhaust 232 performs a similar function on the downstream side of the sulfonation zone 46. The sulfonation zone 46 is provided with a pair of $SO_3$ tubular scrubbers 241 having jets 70 or 71 (shown in FIGS. 3 and 4) which are effective to rapidly sulfonate and striate the polymer film. The excess $SO_3$ gas is exhausted from this zone 46 by a pair of tubular exhausts 242.

In order to remove excess $SO_3$ clinging to the polymer film, a third pair of inert gas tubular scrubbers 223 are provided to scrub the polymer film after treatment in the sulfonation zone 46.

The fourth pair of inert gas tubular scrubbers 224 located outside chamber 10 adjacent to the outlet slot 27 prevent the entrance of moist air from the ambient atmosphere. It is to be understood that the tubular scrubbers 231, 242, 232, 223, and 224 all have an axial slot in them similar to the slot in scrubbers 221 and 222.

The treated film is then dyed in a dye bath 28, blown free of water by air knives 30 and dried in an oven 32 before being wound up on take-up roller 26.

The aforementioned dry inert gas is supplied to the chamber 10 by a supply line 33 having a series of branch lines 34 equipped with control valves 35 and flow rate meters 36. A suitable gas is dry nitrogen but dry air, dry carbon dioxide, and the like are also useful.

Dilute $SO_3$ gas is supplied to the chamber 10 through line 44 by vaporizing liquid $SO_3$ in tanks 38 which are heated to about 33° C. by infrared heaters 40. The latter are controlled by rheostats 42 and are powered by an electric power line (not shown). The $SO_3$ is normally diluted to about 2 percent by volume concentration in a dry inert gas such as carbon dioxide by bubbling the inert gas through the liquid $SO_3$ and controlling the dilution by means of a series of valves 351–357. However, it can be used at 15 percent concentration or higher if greater sulfonation speed is desired. The inert diluent gas, carbon dioxide, sulfur dioxide, nitrogen, and the like is supplied by a tank 58. After leaving the tank 58, the gas is lowered in pressure by the pressure regulator 59, warmed by heater 60, dehydrated in a drier 62, filtered in an aerosol filter 52, and bubbled into the molten $SO_3$ in tank 38 at a rate measured through the meters 36.

The exhaust gases from the sulfonation zone 46 are fed through line 48 into the 95 percent sulfuric acid adsorbing tank 50, filtered in an aerosol filter 52 and exhausted to the atmosphere through a pressure measuring device (manometer) 54 and meter 36 by means of a fan or air pump 56. The flow of exhaust gases is controlled by flow control valves 55.

The gases removed from tubular exhausts 231 and 232 by line 68 receive similar treatment.

Figure 2:
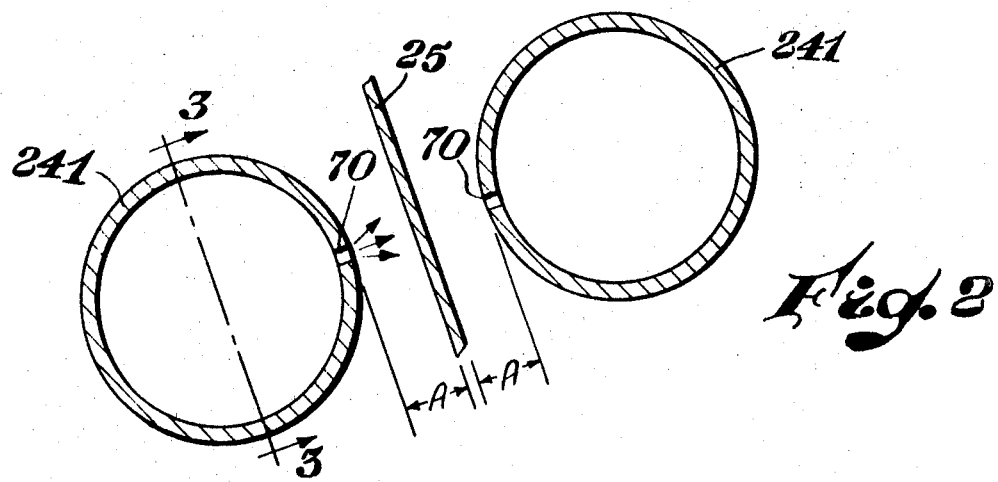
FIG. 2 is a detailed view illustrating the jetlike action of the $SO_3$ tubular scrubbers.

In FIG. 2, jet scrubbers 241 are illustrated showing the jet of gas directed towards the polymer film 25.

FIG. 2 shows the predetermined and/or variable distance "A" at which the jets 70 are located from the film 25 and their location in relationship to the film.

Figure 3:
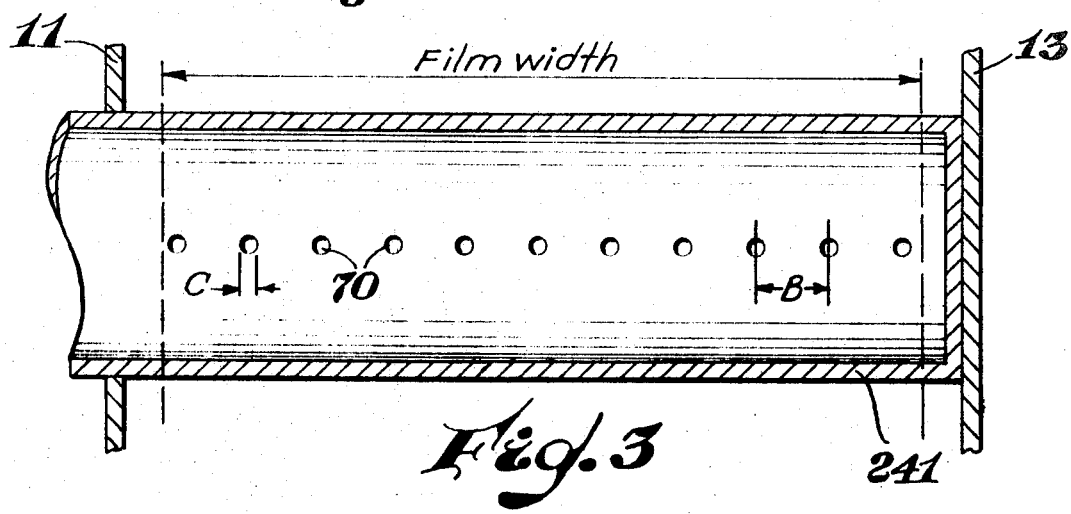
FIG. 3 is a cross sectional view on line 3—3 of FIG. 2 showing the spacing of the jets in relation to the film width.

FIG. 3 shows the round jets 70 located on the $SO_3$ tubular scrubber 241. The latter is mounted between the front side wall 11 and the rear side wall 13. The predetermined width "C" of the jets and the spacing "B" between them is a variable factor determined by such criteria as speed of the film, rate of flow of the gaseous $SO_3$, distance (A) of the film from the jets, etc.

Figure 4:
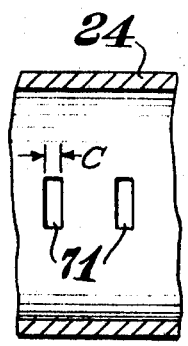
FIG. 4 is a view similar to FIG. 3 showing slot type jets.

FIG. 4 shows the slot jets 71 which can be used in place of the round jets 70 with similar spacing, width, etc.

Figure 5:
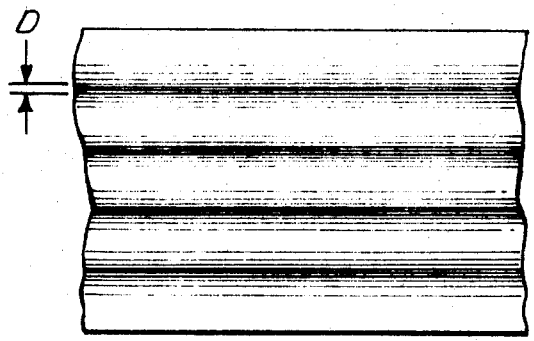
FIG. 5 illustrates a plastic film jet sulfonated in accordance with this invention and subsequently dyed to produce a striated effect or banding which varies from intense coloration lines gradually down to little or no coloration on both sides.

FIG. 5 shows the approximate width of the intense band of coloration of the dyed product of this process. The width "D" is always greater than the width "C" of the jets because the jet of gas tends to widen out oven a short distance into a cone-shaped jet of gas.

In a typical example, a polystyrene film of 10 inch width and 3 mils thickness was run at 60 feet per minute past 12 circular jets of one-sixteenth of an inch in diameter and spaced three-fourths of an inch apart on a pair of jet tubular scrubbers (element 241 in FIG. 2). The film was spaced one-eighth of an inch from the jet scrubbers. The film was striated with a dry gas jet of 2 percent by volume of $SO_3$ diluted with carbon dioxide having a velocity of 150 feet per second. When the film was subsequently dyed with methyl violet, a series of 12 intense bands of violet was observed on both sides of the film in between which the color gradually diminished to almost no color.

In contrast, when the speed of the film is reduced to 40 feet per minute under the same conditions, no striations or banding occurred and the film was uniformly sulfonated and dyed violet. This is believed to be due to the fact that at this speed and with the distances as aforesaid, the $SO_3$ gas has time to spread across the film and uniformly sulfonate it.

Similar undesirable results are obtained if the distance "A" in FIG. 3 is too large for the rate of flow of the $SO_3$ or if the distance "B" is too small or if the width of the jets "C" is too large.

The desired striations are obtained only by a careful balancing of the above factors which can easily be determined by trial and error during production runs of the apparatus.

The foregoing variable distances and widths A, B, and C can be readily adjusted. The distance "A," for example, can be varied by moving the $SO_3$ tubular scrubbers 241 towards the film by conventional means (not shown) such as adjusting screws and slots in the walls 11 and 13 having flexible seals. The width "C" of the jets can be varied by providing inserts or bushings having the desired width or diameter. Other means of providing the desired adjustment will occur to persons skilled in the art.

It is to be understood that the materials used to construct the above described apparatus are not critical and will be readily apparent to those skilled in the art, keeping in mind that $SO_3$ is a highly reactive compound.

We claim:

1. A method for the surface sulfonation of plastic films to achieve a latent striated effect which comprises
    a. moving the plastic film through a substantially dry gaseous sulfonation zone containing a jet generating zone at a predetermined rate of speed, and
    b. simultaneously contacting at least one side of said plastic film in said sulfonation zone with at least one jet of a dry gas containing sulfur trioxide and having a predetermined size from said jet generating zone at a predetermined distance from said zone.

2. The method as set forth in claim 1 in which is included the step of drying the plastic film prior to the sulfonation step.

3. The method as set forth in claim 1 in which the jet of gas containing sulfur trioxide has a flow rate greater than about 10 feet per second.

4. The method as set forth in claim 1 in which the jet of gas containing sulfur trioxide has a flow rate ranging from about 100 to about 200 feet per second.

5. The method as set forth in claim 1 in which said film is contacted with a plurality of said jets which are laterally spaced.

6. The method as set forth in claim 1 in which both sides of said film are contracted with at least one said jet.

7. The method as set forth in claim 1 in which both sides of said film are contacted with a plurality of said jets which are laterally spaced.

8. The method as set forth in claim 1 in which said film has been previously surface sulfonated completely on one side and the opposite side is contacted with at least one said jet.

9. The method of claim 8 in which said opposite side is contacted with a plurality of said jets which are laterally spaced.

* * * * *

PO-1050
(5/69)

UNITED STATES PATENT OFFICE
CERTIFICATE OF CORRECTION

Patent No. 3,617,338            Dated    2 Nov. 1971

Inventor(s)    Robert J. Caiola and Carl E. Dewald

It is certified that error appears in the above-identified patent and that said Letters Patent are hereby corrected as shown below:

Column 1, line 8, delete "or" and insert -- of --.

Column 2, line 4, delete "in" and insert -- is --; in line 16 delete "contracting" and insert -- contacting --; in line 33 delete "being" and insert -- bring --.

Column 4, line 6, delete "oven" and insert -- over --; in line 27 insert -- gas -- after "$SO_3$"

Signed and sealed this 2nd day of May 1972.

(SEAL)
Attest:

EDWARD M. FLETCHER, JR.
Attesting Officer

ROBERT GOTTSCHALK
Commissioner of Patents